May 8, 1923.
W. F. FOLMER
1,454,218
PHOTOGRAPHIC OPTICAL SYSTEM
Filed July 23, 1920     4 Sheets-Sheet 2
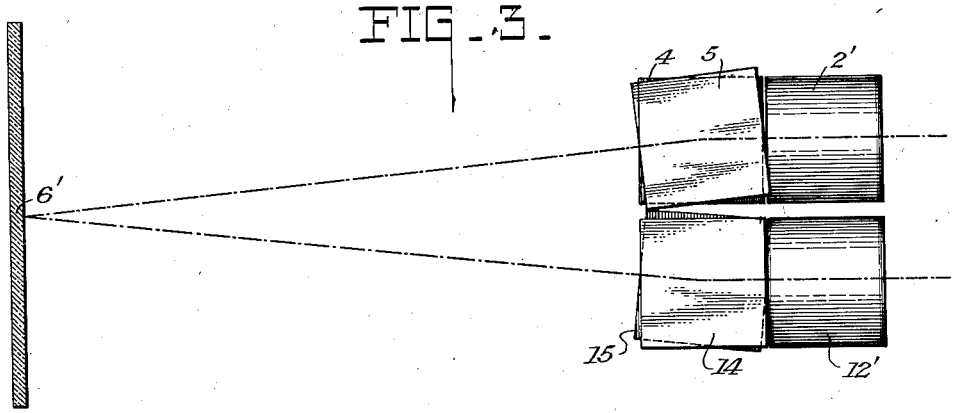
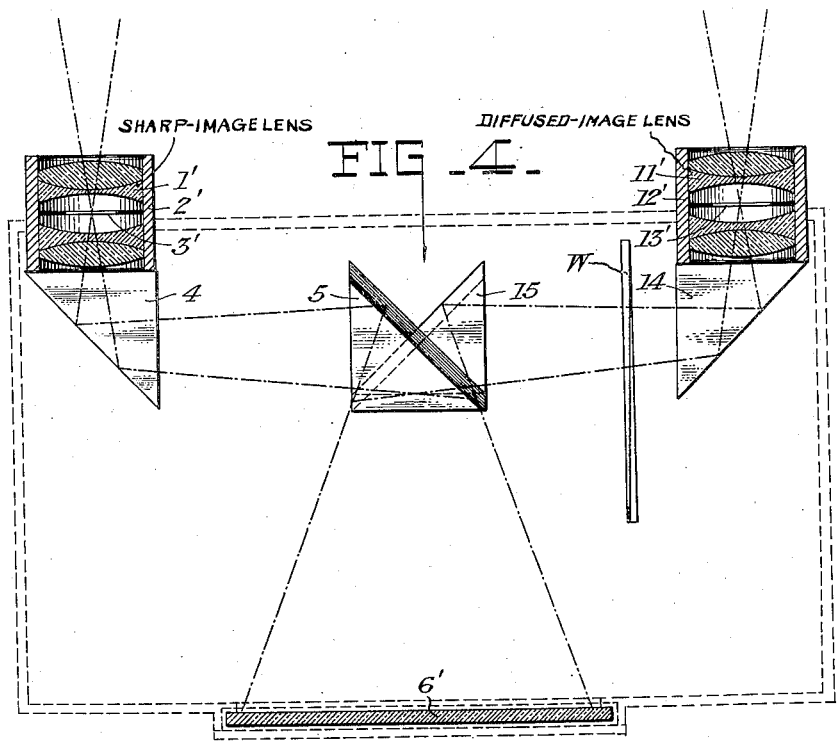
WITNESSES:
INVENTOR
William F. Folmer,
BY
ATTORNEYS.

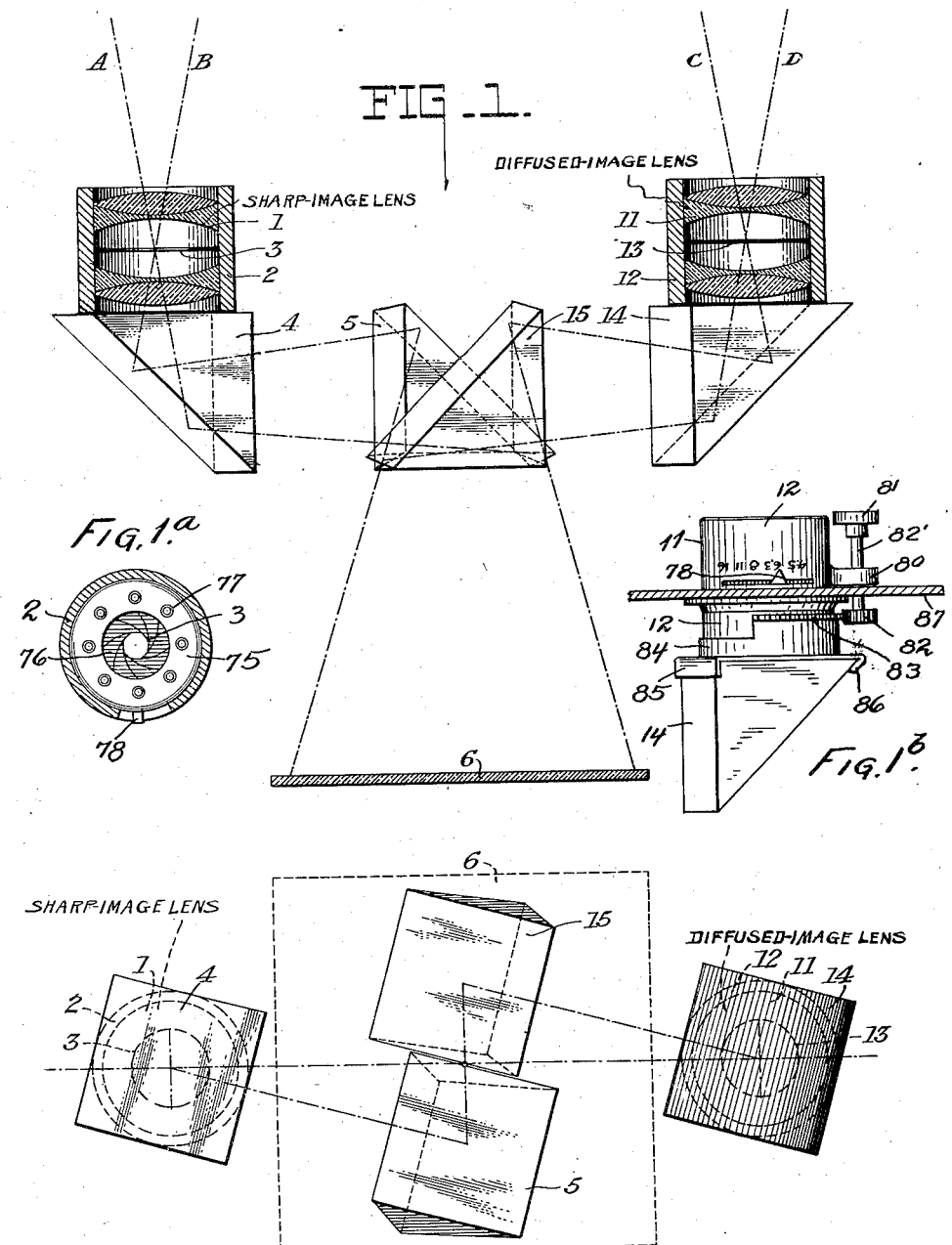

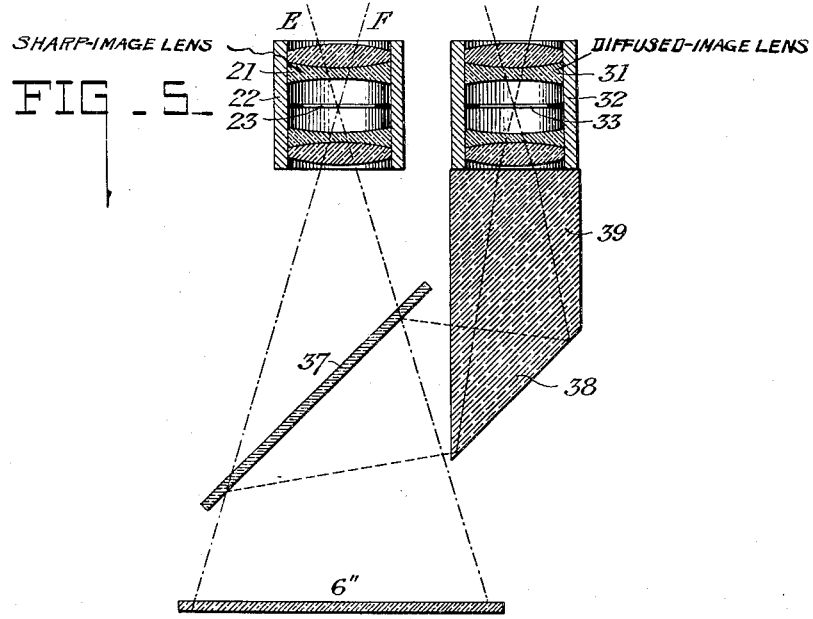
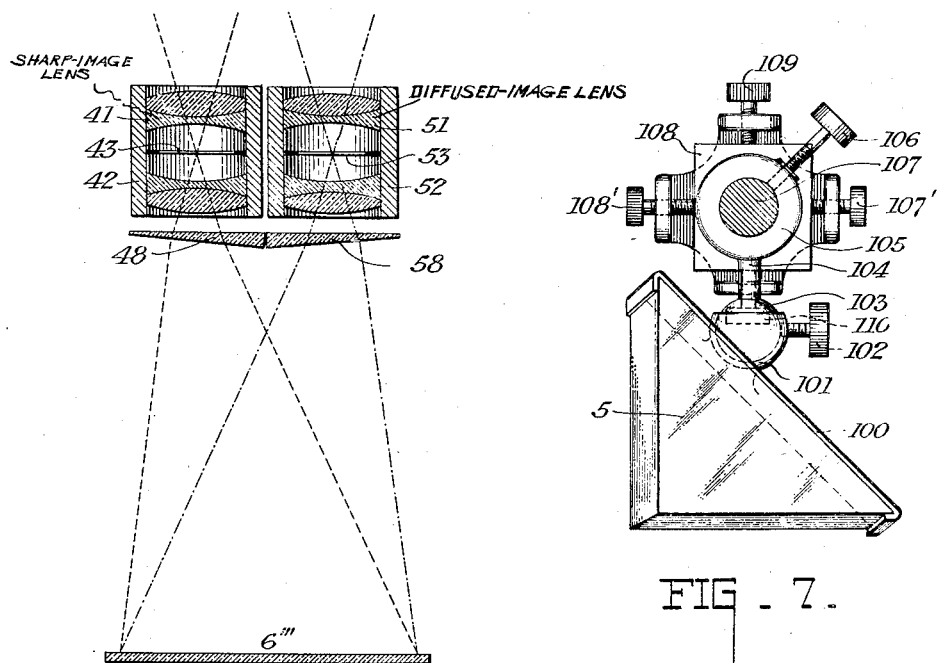

May 8, 1923.
W. F. FOLMER
1,454,218
PHOTOGRAPHIC OPTICAL SYSTEM
Filed July 23, 1920
4 Sheets-Sheet 4
FIG_8_
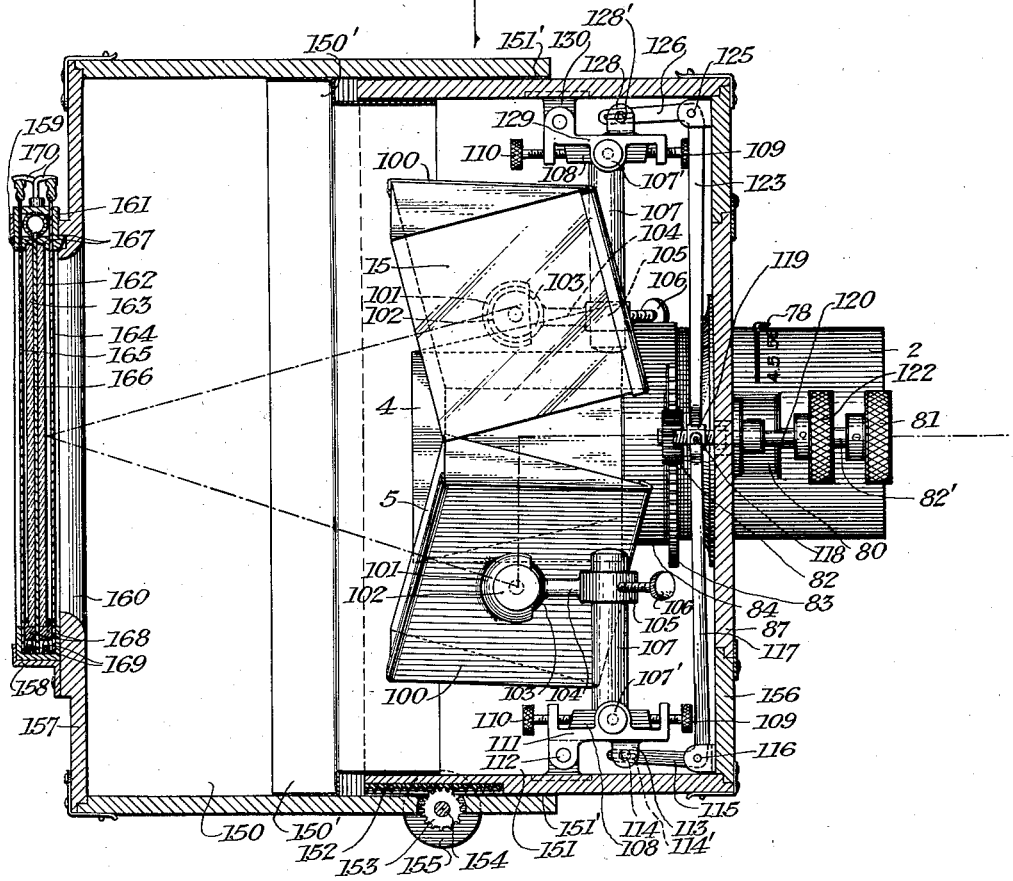
WITNESSES:
Helen M. Fraser
INVENTOR
William F. Folmer,
BY R. L. Stinchfield
Donald H. Stewart
ATTORNEY Patented May 8, 1923.

1,454,218

UNITED STATES PATENT OFFICE.

WILLIAM F. FOLMER, OF ROCHESTER, NEW YORK, ASSIGNOR TO EASTMAN KODAK COMPANY, OF ROCHESTER, NEW YORK, A CORPORATION OF NEW YORK.

PHOTOGRAPHIC OPTICAL SYSTEM.

Application filed July 23, 1920. Serial No. 398,450.

*To all whom it may concern:*

Be it known that I, WILLIAM F. FOLMER, citizen of the United States of America, residing at Rochester, in the county of Monroe and State of New York, have invented certain new and useful Improvements in Photographic Optical Systems, of which the following is a full, clear, and exact specification.

This invention relates to photography and more particularly to the making of artistic, soft, diffused photographs giving a natural, pleasing effect resembling the original subject photographed. One object of my invention is to provide an optical system by which negatives having the desired qualities can be obtained; another object is to provide an optical system by which the desired qualities can be obtained by uniting the images of a highly corrected lens and a lens having certain aberrations so that the sharp image of the first lens will be diffused by the soft image of the second lens; another object is to control the degree of sharpness or diffusion by regulating the relative light passing through the lenses; another object is to provide an apparatus for taking negatives of the desired quality without sacrificing the speed of the objective to secure the soft negative; still another object is to provide a very fast objective system by which negatives can be made under very poor lighting conditions; and other objects will hereinafter appear.

The highly corrected modern anastigmat lenses, now almost universally used, have many desirable qualities such as speed, flat field, etc., which are highly desirable in practically all classes of photography. The wire sharp image which such lenses produce when properly focused are unnatural and inartistic. Many lenses now on the market have adjustments by which soft or diffused focus prints can be made, but the images so made are generally degraded, as the lack of correction caused by the diffusion adjustment leaves no part of the image sharp, but a flattening of the lines of which the image is made up, so that much of the beauty of the original subject is lost. Some of the portrait lenses produce images of pleasing softness, but the curved field which is inherent in such lenses greatly reduces their usefulness. So far as I am aware, the best results from the standpoint of the pictorial artist, which have been heretofore obtained, have been by using a soft focus lens stopped down for a part of the exposure and using a full aperture for a part or with star diaphragms, so that the lines of the picture show a fairly sharp outline merged into softness. This has the great disadvantage of requiring a long exposure, and being practical only for enlarging.

With an apparatus constructed in accordance with my invention I get any desired degree of diffusion by regulating the light which is projected upon a plate by two lenses. one preferably a highly corrected anastigmat and the other a soft focus lens. Both lenses must be of the same focal length. This system has the advantage of great speed, true rendering of the details, and control of the effect, as the subject can be composed on a ground glass in the usual manner, the operator adjusting the light to secure the desired effect.

Coming now to the drawings, in which like reference characters denote like parts;

Fig. 1 is a diagrammatic plan of an optical system constructed in accordance with one embodiment of my invention, parts being shown in section;

Fig. 1^A is a section through a lens barrel showing an iris diaphragm;

Fig. 1^B is a plan of a prism mounted to revolve about the axis of a lens;

Fig. 2 is an end elevation of the system illustrated in Fig. 1, looking toward the lenses from the plate, here shown in broken lines;

Fig. 3 is a side elevation of another embodiment of my invention;

Fig. 4 is a plan of the parts shown in Fig. 3 with a conventional camera indicated in broken lines;

Fig. 5 is another embodiment of my invention, the parts being shown diagrammatically in section;

Fig. 6 is a sectional diagrammatic plan of still another embodiment of my invention;

Fig. 7 is a plan, part in section, of one of the adjustments used for setting a prism; and Fig. 8 is a section through a camera constructed in accordance with, and illustrating one form of my invention.

In the diagram Fig. 1 there is a highly corrected anastigmat lens 1, mounted in a barrel 2 having an iris diaphragm 3, all of any well known design. This lens is mounted on a camera lens board, and the light passing through lens 1 is reflected by a prism 4 to a second prism 5 and thence to a plate 6. Prisms 4 and 5 are mounted in the camera body, and are made with an adjustable mount, so that the image can be properly directed to plate 6. Prism 4 is mounted to rotate about the axis of the lens 1 as the adjustments shown in Fig. 7 of prism 5 are chiefly used in setting up my optical system for the first time. Prism 5 is carried (Fig. 7) by a plate 100 carrying a socket 101 permanently attached thereto. A set screw 102 impinges upon a ball 103, to hold the parts in the required position, the ball being connected by a rod 104 to a slidable bearing 105. A second set screw 106 fastens bearing 105 at the desired elevation upon an upstanding rod 107 carried by a movable base 108. Base 108 is slidable in two directions by means of adjusting screws 107′, 108′, 109 and 110, two of which are adjusted together to move the carriage or base 108 in one direction. This mount makes it possible to move the prism in any direction necessary to reach the required position, and, since this device need not be moved after being once set, more elaborate mechanism is not necessary. Of course any mechanism by which the prism can be properly set in place can be used, but I show a preferred form in Fig. 7. The camera lens board has a second lens 11, which, like lens 1, is mounted in a barrel 12 having an iris diaphragm 13. Lens 11 is of the type which gives a diffused, soft, or fuzzy image when used at full aperture, such as is well known in the photographic art, and is of the same focal length as lens 1. This lens may be an anastigmat lens having certain aberrations introduced to give a diffused image, or it may be of the single meniscus or portrait type. On the drawings the two lenses have been labeled "Sharp" and "Diffused", these terms being used to indicate lenses of the characteristics above described. Two prisms 14 and 15 reflect the light rays to the plate 6 where they overlie the rays projected by lens 1 as indicated in Fig. 1, where lines A—B indicate the rays passing through lens 1 and the lines C—D those going through the diffused focus lens 11. In Fig. 2 the dash and dot lines indicate the paths of light pencils entering lenses 1 and 11, through their respective prisms to the center of plate 6, here designated by a small circle, the plate outline being shown in dashed lines.

I have shown this optical system diagrammatically in Fig. 1, with structural details of the diaphragm preferably used in all instances shown in Fig. 1ᴬ, and a detail of the mounting for prisms 4 and 14 in Fig. 1ᴮ. Coming now to Fig. 8, where I have shown a section through a typical camera equipped with the optical system above described, the camera itself consists of telescoping boxes 150 and 151, which can be moved to and from each other by a rack 152 upon one box, with which a pinion 153 carried on the other box, meshes. This pinion, carried upon a shaft 154, is operated by a knob 155, so that relative adjustment of the camera parts can be readily made. Suitable light guards are provided, a metal flange 150′ on box 150, and felt or plush 151′ on box 151. The back 157 is reversible and has a central aperture 160 through which the exposure is made. A plate holder 161 is held in place by suitable members 158 and 159. The plate holder here shown is of a well known type, wherein photographically sensitive plates 162 and 163 are held in place with their upper edges under the rabbets 167—167 by bars 168—168 which are pressed upwardly by springs 169—169. The dark slides 164—165 are normally held in place by turn-buckles 170—170. A partition 166 separates the plates. The front of the camera consists of a frame 156 removably attached to box 151, there being a lens board 87 carried in the central portion of the frame. As shown in Fig. 1ᴮ the prism 14 is carried by a plate having flanges 85 and 86 engaging the corners of the prism, there being an annular flange 84 surrounding and sliding about the outside of lens barrel 12. A rack 83 flared outwardly from flange 84 provides a means for adjusting the prism, as a pinion 82 is on a shaft 82′ operated by knob 81, the shaft extending through the lens board 87. A bearing 80 on the lens barrel is provided for this shaft. A pointer 78 connected to an annular plate 75 with which each of the leaves 76 (Fig. 1ᴬ) co-operates, the lens being pivoted at 77, is for adjusting the diaphragm. This is of the well known type having a movable plate 77 and a stationary plate to which the leaves are pivoted, so that by rotating one relative to the other, the opening changes. Such a structure is also used for prism 4, as shown in Fig. 8. Prisms 5 and 15 are carried by the adjustable mechanism shown in Fig. 7, these parts being mounted in the camera proper, as will now be described. The base 108 is slidable in two directions by adjusting screws 107′, 108′, 109 and 110, and the casting 111, which carries these screws is hinged at 112 to the camera box 151. A lug 113 extending downward from casting 111 carries a pin 114 which extends in a slot 114' in one end 115 of a bell crank lever fulcrumed at 116 to the camera. The long arm 117 is pivoted by a pin and slot to a sleeve 118 which rides along the thread 119 of shaft 120, which is operated by a knob 122. As can be readily seen this mechanism moves or rotates the prism 5 through a vertical plane without in any way altering the Fig. 7 adjustments. Similarly, prism 15 is mounted upon a casting 129 hinged at 130 to the camera, and having a lug 128 and pin 128' which enters the slotted arm 126 of a bell crank lever fulcrumed at 125 to the camera. Arm 123 has a pin and slot connection to sleeve 118, so that both prisms 5 and 15 are moved together by knob 122, and to the same degree. The image cast by one lens, preferably lens 1, can be focused on a ground glass (by capping the other lens if desired) and then the images of the two lenses registered by a slight turn of knob 122. I find, however, that with practice the operator can readily focus the camera properly without capping one lens.

With this apparatus I can compose my picture upon the ground glass, and after adjusting the light to give the degree of diffusion wanted, can make a rapid exposure, thereby producing a latent image on a plate which may be later used for direct printing or enlarging. Practically no retouching is necessary on such a negative. The quality of negatives thus produced differs from the usual negatives made with anastigmat or portrait lenses in that there is a sharply defined image (made with lens 1) over which a softened image is laid, (by lens 11) thereby shading off the sharp line into a softness which gives an atmospheric effect, and stereoscopic likeness or feeling of depth which is greatly desired for some subjects. By optically combining the light emanating from two lenses, very short exposures can be produced, for a light intensity approximately twice of that of one of the lenses can be secured, assuming that they are of the same speed. Of course some light is lost in reflection, but only a comparatively small amount. For portraits and close up motion picture work very artistic results can be obtained, and many landscapes are improved by a softening of the hard lines where none of the detail is thus destroyed.

In this specification when I refer to the images being superimposed or registered, I mean that they are substantially in registry, as this optical system cannot entirely overcome the lack of registration due to parallax, which is inherent in such a device. This lack of registration is so slight that it is not noticeable where a sharp and a soft image are combined, and this is particularly true of some of the modifications which I have illustrated. The lens separation in some cases is an advantage, for if desired, a compensating adjustment can be used (by rotating one system relative to the other) so that the images of the principal plane of focus will be coincident. Slight keystone distortion exists in the embodiment of my invention shown in Fig. 1, but the softness of the image produced by lens 11 renders this unobjectionable if not entirely unnoticeable.

In Figs. 3 and 4 I show another arrangement in which lenses 1' and 11' are mounted in barrels 2' and 12' having iris diaphragms 3' and 13', the system of prisms 4 and 5, 14 and 15 being for bending the light passed by the lenses to the plate 6'. In dashed lines a diagrammatic camera is illustrated.

The light from the lenses, and consequently the diffusion of the image can be controlled by the iris diaphragms 3' and 13'. In some types of soft focus lenses, however, it is preferable to reduce the quantity of light without using a small aperture, because the diffusion reduces with the stop. I, therefore, use a colored screen to hold back a portion of the light, or I may use what is sometimes known as a neutral wedge—W in Fig. 4—which merely holds back a portion of the light, without altering it optically.

In Fig. 5 the lenses 21 and 31 are of the sharp and diffused focus type respectively, mounted in the barrels 22 and 32 having iris diaphragms 23 and 33. Light entering lens 21 is projected along lines E—F through the semi-transparent mirror 37 to the plate 6''. Mirror 37 is made by electrically depositing platinum upon a sheet of optically flat glass, as is well known, being used in color photography. Behind lens 31 there is a prism 38 which, in this instance, is combined with a compensating glass block 39 so that the light pencils from lens 31 will come properly to a focus upon plate 6''. While this system suffers slightly from parallax, the fault is reduced to a minimum and there is no key-stone distortion at all. As the platinized mirror is usually constructed to pass half and reflect half of the light, this system has not the benefit of the added speed of the two lenses, but is sufficiently fast for most purposes. By providing a series of mirrors 37 platinized so as to pass more or less light than the half and half which I generally use, the light intensity emanating from each lens can be controlled entirely without the use of diaphragms or filters.

Fig. 6 shows one of the simplest embodiments of my invention, where lenses 41 and 51 are placed close together, being mounted in barrels 42 and 52 in which there are diaphragms 43 and 53. The wedges 48 and 58 bend the light into registry upon plate 6'''. The relative volume of light passed by each lens can be controlled by diaphragms, by filters, or by including the filter in a wedge 48 or 58, as desired. In this type there is no keystone distortion and almost no parallax, as the lenses are close together.

I have frequently referred to "plate" in this specification, having used the term to designate the support for a light sensitive photographic emulsion. I intend this term to embrace any film base such as the well known pyroxylin supports now widely used.

The lack of registration, due to parallax and in come cases due to keystone distortion, is present in the various forms illustrated to a greater or lesser degree, but it should be understood that to the eye of an observer this is practically impossible to discover because the diffused image need not register with the exactness which would be necessary if two sharp images were superimposed. For all intents and purposes, therefore, substantial registration is secured by the systems illustrated.

It is obvious that modification may be made within the scope of my invention, and I do not wish to be limited to the forms herein illustrated, but contemplate as within the scope of my invention all similar devices which come within the scope of the appended claims.

Having thus described my invention, what I claim as new and desire to secure by Letters Patent is:

1. In an optical system for use in making artistic photographs, the combination with two lenses, one adapted to sharply define an object being photographed, the other being adapted to give a diffused image thereof, and means for superimposing images from the two lenses.

2. In an optical systm for use in making artistic photographs, the combination with two lenses adapted to define an object being photographed with different degrees of sharpness of definition, and means for superimposing the two images.

3. In an optical system for use in making artistic photographs, the combination of a well corrected lens and a lens having certain aberrations, means for simultaneously directing the light rays from the lenses to a superimposed position.

4. In an optical system for use in making artistic photographs, the combination of a lens adapted to render a sharply defined image of an object being photographed and a lens adapted to render a diffused image of an object being photographed, means for directing the light emanating from the lenses to form a single diffused image, and means for regulating the relative intensity of the light transmitted by each lens, thereby controlling the degree of sharpness or diffusion of the resulting combined image.

5. In an optical system for making diffused artistic photographs, the combination with lenses of different degrees of correction, means for controlling the volume of light passing through the lenses, and light deflecting mediums, the light deflecting mediums directing the rays of light from the lenses to a predetermined position.

6. In an optical system for making diffused artistic photographs, the combination with lenses of different degrees of correction, means for selectively controlling the light passed by each lens, and means for bending the light emanating from a lens so that the images projected by the lenses will be superimposed upon each other.

7. In a camera, the combination with two lenses of different degrees of correction mounted on the front thereof, of a plateholder, means on the camera for holding a plate in the plateholder in position for exposure, and means in the camera for directing the light rays from the lenses to the plate so as to produce a composite diffused image of the subject being photographed.

8. In a camera, the combination with two lenses mounted on the front thereof, the lenses being of different degrees of correction, of a plateholder adapted to hold a light sensitive plate, and means in the camera for directing the images projected by the lenses to a predetermined position upon the plate to make a single diffused latent image on said plate.

9. In a camera, the combination with two lenses of different degrees of correction mounted on the front thereof, of a plateholder adapted to hold a sensitive plate, means on the camera for holding said plate in the focal plane of the lenses, and means for bending the light paths emanating from the lenses to a predetermined location on said plate, whereby the image from one lens will diffuse and soften the image made by the other.

10. In a camera, the combination with a holder for photographically sensitive material, of lenses mounted upon the camera, said lenses being of different degrees of correction, means for adjusting the relative light intensities passed by the lenses, and means for bending the light cones emanating from the lenses and directing said light cones to the photographically sensitive material contained in said holder where they will overlie one upon the other to produce a soft artistic latent image.

11. In a camera, the combination with a plateholder adapted to hold a photographically sensitive plate, light reflecting means in the camera, lenses mounted on the camera, one lens being adapted to render sharply defined the lines of an object being photographed, and one lens being adapted to render diffused the lines of an object being photographed, said light reflecting means causing the images cast by the lenses to overlie one upon the other upon the photographically sensitive plate, whereby the resulting latent image will consist of sharply defined lines shaded out into the diffused lines giving a realistic rounded effect.

Signed at Rochester, New York, this 20th day of July, 1920.

WILLIAM F. FOLMER.